United States Patent
Masuda et al.

[11] Patent Number: 5,598,813
[45] Date of Patent: Feb. 4, 1997

[54] INTERNAL COMBUSTION ENGINE WITH EXHAUST CONTROL DEVICE

[75] Inventors: Tatsuyuki Masuda; Minoru Iida, both of Iwata, Japan

[73] Assignee: Yamaha Hatsudoki Kabushiki Kaisha, Iwata, Japan

[21] Appl. No.: 257,349

[22] Filed: Jun. 9, 1994

[30] Foreign Application Priority Data

Jun. 14, 1993 [JP] Japan .................................. 5-142158

[51] Int. Cl.⁶ ............................................ F02B 25/00
[52] U.S. Cl. ........................................... 123/65 PE
[58] Field of Search ........................... 123/65 PE, 65 V, 123/65 P, 65 VA, 65 EM, 65 A, 195 AC; 251/129.11, 129.12, 129.13

[56] References Cited

U.S. PATENT DOCUMENTS

| | | |
|---|---|---|
| 4,368,703 | 1/1983 | Shibata . |
| 4,388,894 | 6/1983 | Tanaka et al. ................. 123/65 PE |
| 4,541,371 | 9/1985 | Kageyama et al. ............. 123/65 PE |
| 4,672,925 | 6/1987 | Miyata et al. .................. 123/65 PE |
| 4,706,617 | 11/1987 | Asai et al. ....................... 123/65 V |
| 4,714,056 | 12/1987 | Tottori et al. .................. 123/65 PE |
| 4,751,899 | 6/1988 | Ohki et al. ...................... 123/65 PE |
| 4,794,309 | 12/1988 | Saito et al. .................... 251/129.13 |
| 4,829,945 | 5/1989 | Yamamoto et al. ............. 123/65 PE |
| 5,136,989 | 8/1992 | Sterbenz et al. ................ 123/65 PE |
| 5,255,891 | 10/1993 | Pearson et al. ............... 251/129.11 |
| 5,257,674 | 11/1993 | Okui et al. ..................... 123/195 AC |
| 5,341,775 | 8/1994 | Yamauchi ....................... 123/65 PE |

FOREIGN PATENT DOCUMENTS

| | | |
|---|---|---|
| 0205415 | 12/1986 | European Pat. Off. . |
| 0382063 | 8/1990 | European Pat. Off. . |
| 0413316 | 2/1991 | European Pat. Off. . |
| 0413317 | 2/1991 | European Pat. Off. . |
| 0482662 | 4/1992 | European Pat. Off. . |
| 4030768 | 4/1991 | Germany . |
| 807709 | 1/1959 | United Kingdom . |
| 2192937 | 1/1988 | United Kingdom . |
| 9301402 | 1/1993 | WIPO . |

*Primary Examiner*—Marguerite McMahon
*Attorney, Agent, or Firm*—Knobbe, Martens, Olson & Bear

[57] ABSTRACT

An exhaust control drive arrangement for an internal combustion engine for varying the exhaust port timing and effective compression ratio. The exhaust control valve is driven by a servomechanism mounted directly on the cylinder block at one end of the engine and adjacent the flywheel so as to provide a compact assembly.

5 Claims, 8 Drawing Sheets

INTERNAL COMBUSTION ENGINE WITH EXHAUST CONTROL DEVICE

BACKGROUND OF THE INVENTION

This invention relates to an internal combustion engine and more particularly to an improved exhaust control device for such engines and an arrangement for operating the exhaust control valve of this type of engine.

In many types of engine applications, particularly those employing two cycle engines, it has been proposed to employ an exhaust control valve that controls the timing of opening and closing of the exhaust valve and/or the effective compression ratio of the engine. By changing the position of the exhaust control valve, it is possible to operate at higher compression ratios under low, and mid-range load and to reduce the compression ratio to extend the engine life under high loads. In addition, the variation in the timing of the exhaust port opening and closing can be adjusted for other purposes such as exhaust emission control or the like.

This type of control is frequently used on vehicles such as motorcycles that are very compact in nature and do not afford significant room for external mounting of accessories or controls directly on the engine. Therefore, it has been the practice to provide a wire transmitter that is operated by a remote operator and which controls the exhaust control valve. However, the use of such motion transmitting mechanisms can induce inaccuracies in the system.

It is, therefore, a principle object of this invention to provide an improved operating mechanism for the exhaust control valve of an internal combustion engine.

It is a further object of this invention to provide an improved exhaust control valve for an internal combustion engine and drive mechanism therefore which can be conveniently mounted on the engine without interference or excess spacial requirements.

It is a further object of this invention to provide an improved exhaust control valve operator that can be easily mounted on the engine.

SUMMARY OF THE INVENTION

This invention is adapted to be embodied in an internal combustion engine having a pair of relatively movable components which define a combustion chamber. An exhaust port communicated the combustion chamber with the atmosphere and an exhaust control valve is provided for controlling the timing of the events of the exhaust port opening and/or closing. A servo-drive mechanism is mounted on one of the engine components for operating the exhaust control valve.

DETAILED DESCRIPTION OF THE PREFERRED EMBODIMENTS OF THE INVENTION

Referring now in detail to the drawings to the embodiment of FIGS. 1–9, this embodiment is depicted as being applied to a three cylinder, in-line, two cycle, crankcase compression internal combustion engine indicated generally by the reference numeral 21 operating on a diesel cycle. Although the invention is described in conjunction with a diesel engine, it will be readily apparent to those skilled in the art how the invention may be employed in conjunction with spark ignited engines. Also, although a three cylinder in-line engine is disclosed, it will be readily apparent to those skilled in the art how the invention can be applied to engines having other cylinder numbers and other cylinder configurations. Also, since the invention has particular utility with ported type engines such as two cycle engines, it will be apparent that certain facets of the invention may also be employed in conjunction with rotary rather than reciprocating engines.

The engine 21 includes a cylinder block assembly, indicated generally by the reference numeral 22 that is provided with three aligned cylinder bores 23. The cylinder bores 23 may be formed either by boring directly in the cylinder block 22 or, in the case of light alloy cylinder blocks, by liners or coatings applied to the cylinder bores.

Pistons 24 reciprocate within the cylinder bores 23 and are connected by means of piston pins 25 to the upper or small ends of connecting rods 26. The lower ends of the connecting rods 26 are journaled on the throws of a crankshaft 27. The crankshaft 27 is journaled for rotation within a crankcase assembly, indicated generally by the reference numeral 28 and which is formed by the skirt of the cylinder block 22 and a crankcase member 29 that is affixed in a suitable manner to the cylinder block 22. This crankcase assembly 28 forms crankcase chambers 31 in which the crankshaft 27 rotates. As is well known with two cycle crankcase compression engine practice, the crankcase chambers 31 associated with each of the cylinder bores 23 are sealed relative to each other in an appropriate manner.

A balancer shaft, indicated generally by the reference numeral 32, is mounted in a side chamber 33 formed at one side of the crankcase chamber 28 and is driven off the crankshaft 27 by a gear transmission 34 at crankshaft speed but in an opposite direction of rotation.

An induction system is provided for delivering an air charge to the crankcase chambers 31. This induction system includes an air manifold 35 that is affixed to one side of the cylinder block 22 and which draws air from the atmosphere through a suitable atmospheric air inlet device (now shown). This air inlet device may include a silencing mechanism and/or a filtering mechanism. The manifold 35 has a plurality of outlets, each of which mate with a respective intake port 36 formed in the crankcase assembly 28. Reed type check valves 37 are provided in each of the intake ports 36 so as to permit a charge to be drawn into the crankcase chambers 31 when the pistons 24 are moving upwardly and for precluding reverse flow when the pistons 24 move downwardly to compress the charge in the crankcase chambers 31.

The charge which has been compressed in the crankcase chambers 31 by the downward movement of the pistons 24 is then transferred through a scavenge system to a combustion chamber formed above the head of the piston 24 by the cylinder bore 23 and a cylinder head assembly 38 that is affixed to the cylinder block 22 in a known manner. This scavenge system terminates in scavenge ports, one of which appears in FIG. 1 and is identified by the reference numeral 39 with the three scavenged passages serving each cylinder being identified by the reference numerals 41, 42, and 43 in FIG. 4. This scavenging system is just typical of the type which may be employed with the invention.

The cylinder head assembly 38 is comprised of a lower cylinder head member 44 which actually closes the cylinder bore 23 and an upper cylinder head member 45 which are secured to each other and to the cylinder block 22 in a well-known manner. A precombustion or torch chamber 46 is formed in part by recesses in the cylinder head members 45 and 46 and by an insert piece 47 which chamber 46 communicates with the main combustion chamber formed in the cylinder bore 23 through an orifice or throat 48.

A fuel injector 49 is mounted in the cylinder head assembly 38 and specifically the cylinder head member 45 and discharges fuel into the precombustion chamber 46. If desired, a glow plug 51 may also be mounted in the cylinder head member 45 and project into the prechamber 46 to assist in starting particularly under cold temperature conditions.

As the piston 24 moves upwardly further compressing the charge in the combustion chamber and the prechamber 46, the fuel injected by the injector 49 will ignite and expand in the prechamber 46 and pass through the throat 48 into the main chamber wherein combustion continues to drive the piston 24 downwardly.

A main exhaust port 52 is formed in the cylinder block 22 and extends outwardly through the cylinder block to communicate with an exhaust passage 53. An exhaust manifold 54 is affixed to the cylinder block and collects the exhaust gasses from the exhaust passages 53 for discharge to the atmosphere in a well-known manner through any suitable exhaust system.

In addition, auxiliary exhaust ports 55 are formed in the cylinder block 22 above the main exhaust ports 52 and communicate with auxiliary exhaust passages 56 that also terminate in the exhaust passages 53 of the cylinder block 22.

Figure 1:
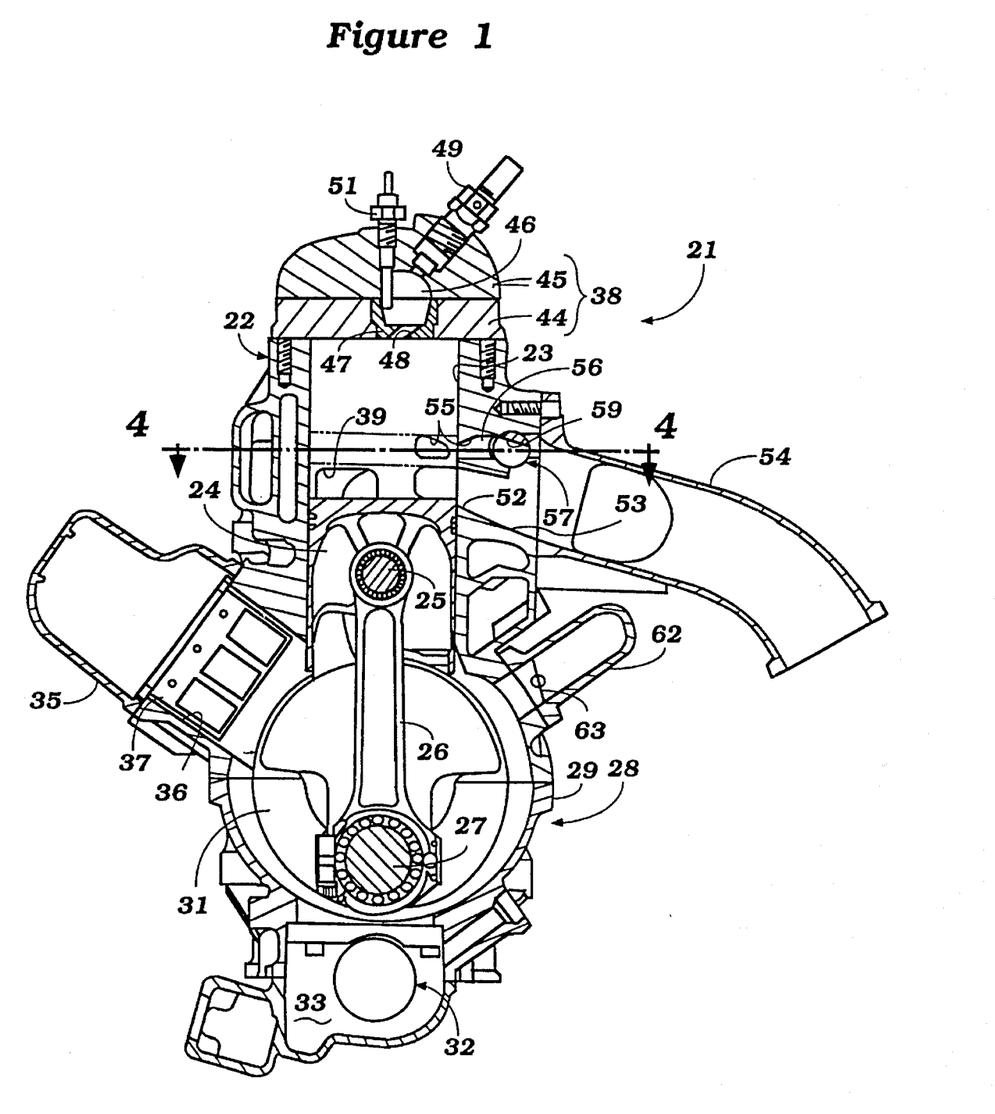
FIG. 1 is a transverse cross-sectional view taken through a single cylinder of a multiple cylinder internal combustion engine constructed in accordance with an embodiment of the invention.
Figure 2:
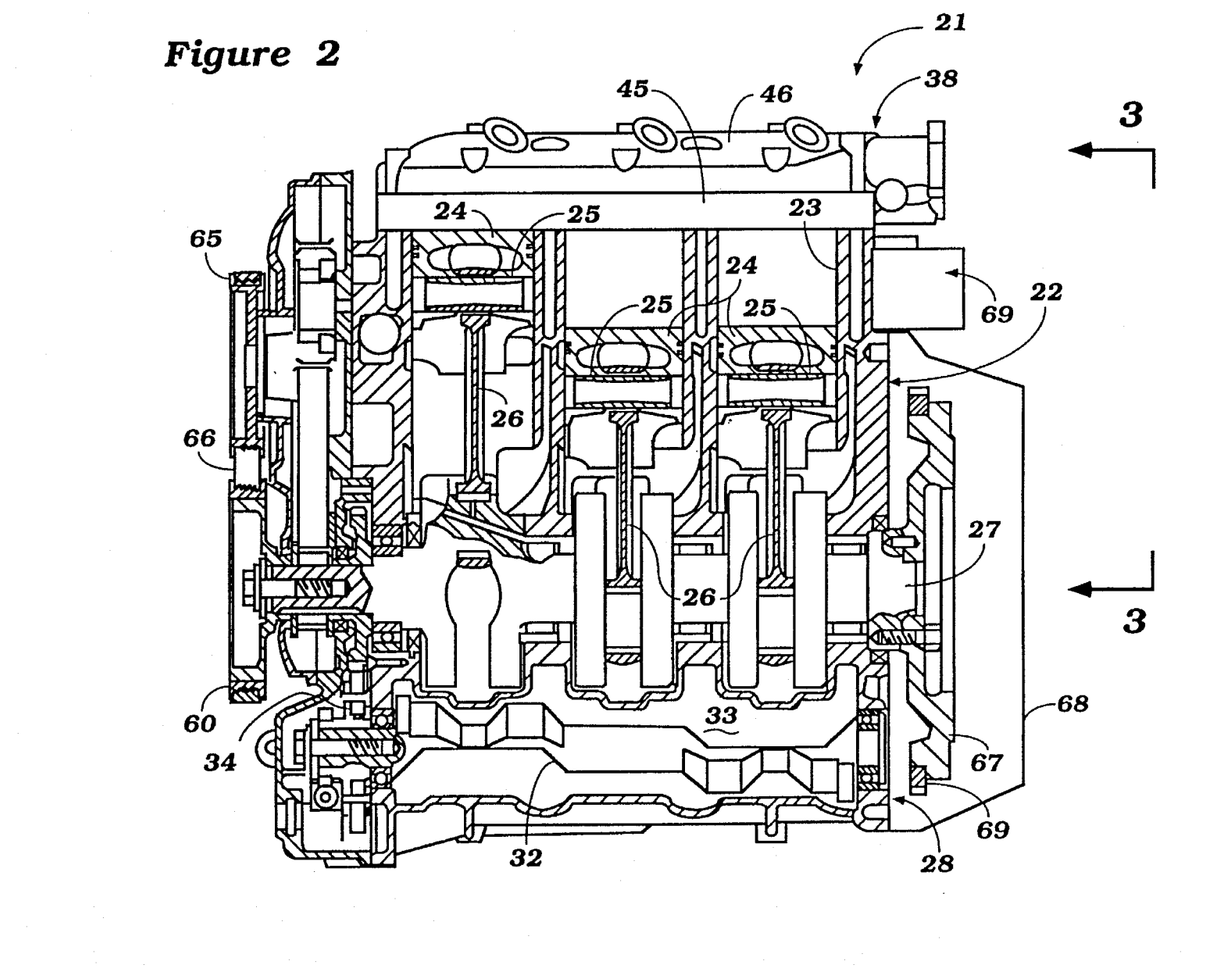
FIG. 2 is a side elevational view of the engine, with portions broken away and shown in section.
Figure 3:
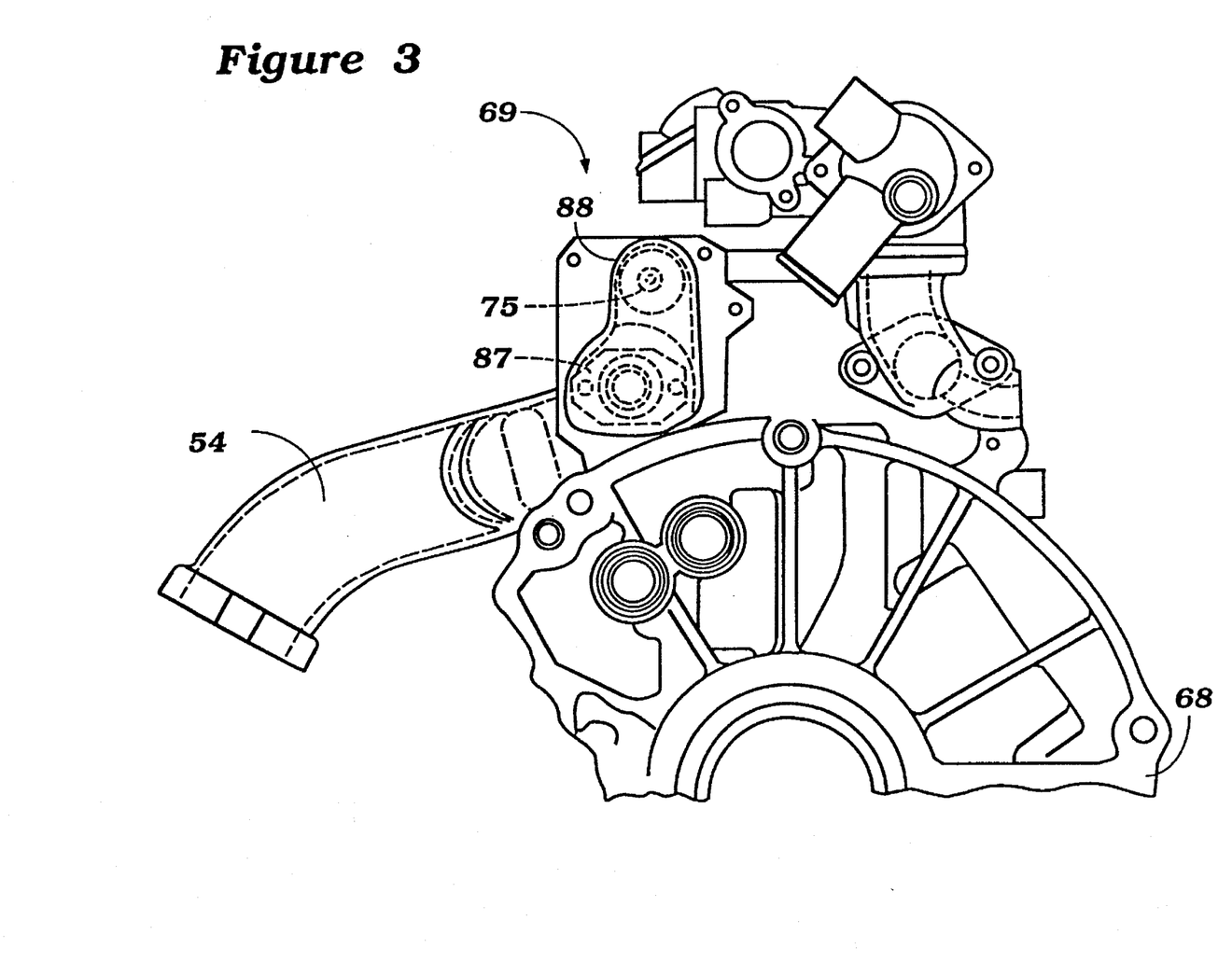
FIG. 3 is an enlarged rear elevational view taken generally in the direction of the line 3—3 of FIG. 2.

The opening and closing of the auxiliary exhaust ports 55 and auxiliary exhaust passages 56 is controlled by an exhaust control valve assembly, indicated generally by the reference numeral 57. As is well known in this art, the exhaust control valve assembly 57 may be moved from a first position as shown in FIG. 1 wherein the auxiliary exhaust ports 55 will open to permit exhaust gasses to flow from the combustion chamber through the exhaust system and including exhaust passage 53 and exhaust manifold 54 before the exhaust ports 52 are opened. Also, these auxiliary exhaust ports 55 are closed later when the piston is approaching top dead center and hence the opening of the auxiliary exhaust passages 55 tends to delay the closing of the exhaust port and advance the opening of the exhaust port so as to provide a decreased effective compression ratio. Normally, this condition is achieved under high speed, high load running conditions so as to extend engine life while still permitting high compression ratios and good economy at low and mid range speeds.

Figure 4:
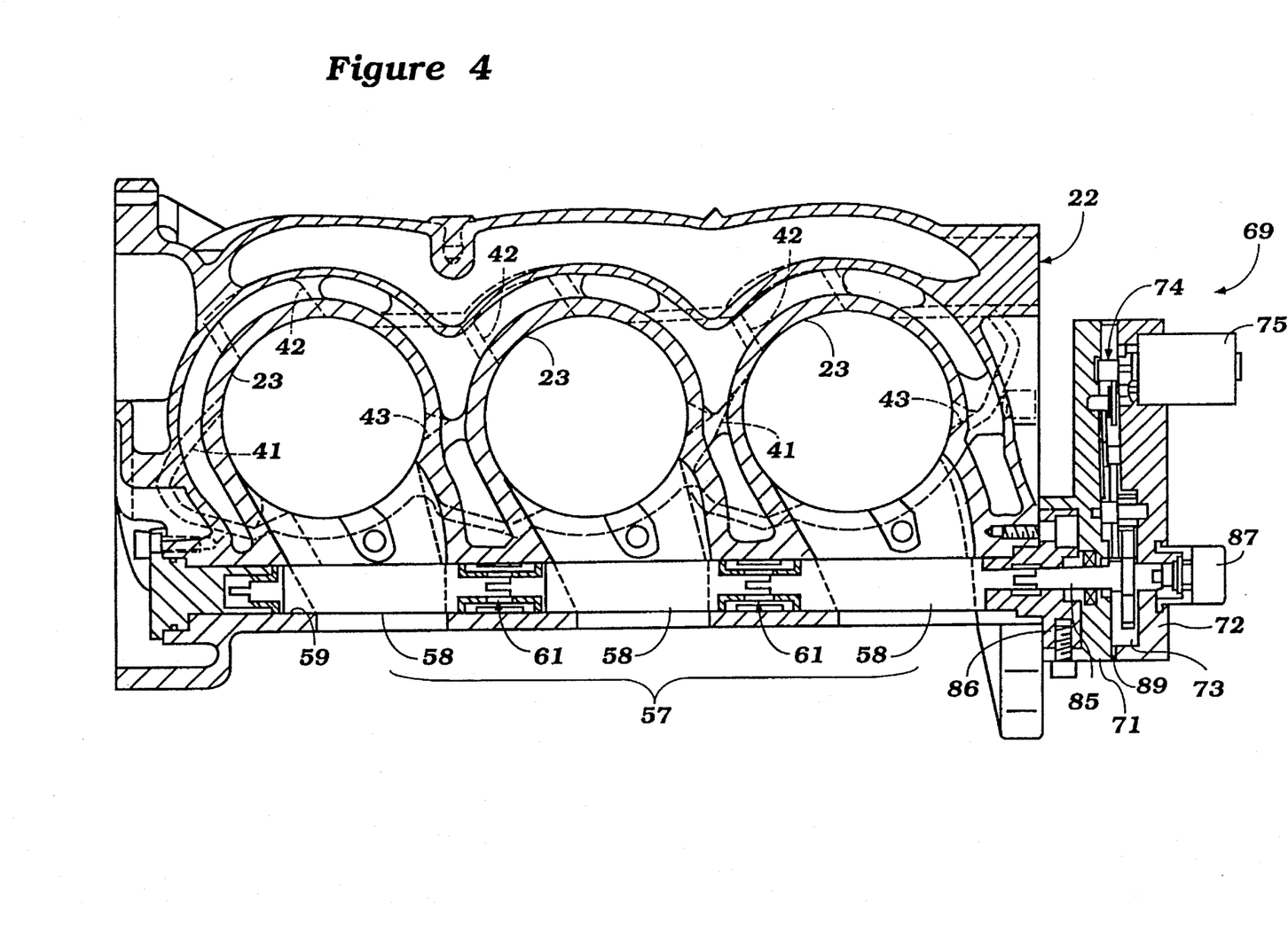
FIG. 4 is an enlarged cross-sectional view taken along the line 4—4 of FIG. 1.
Figure 5:
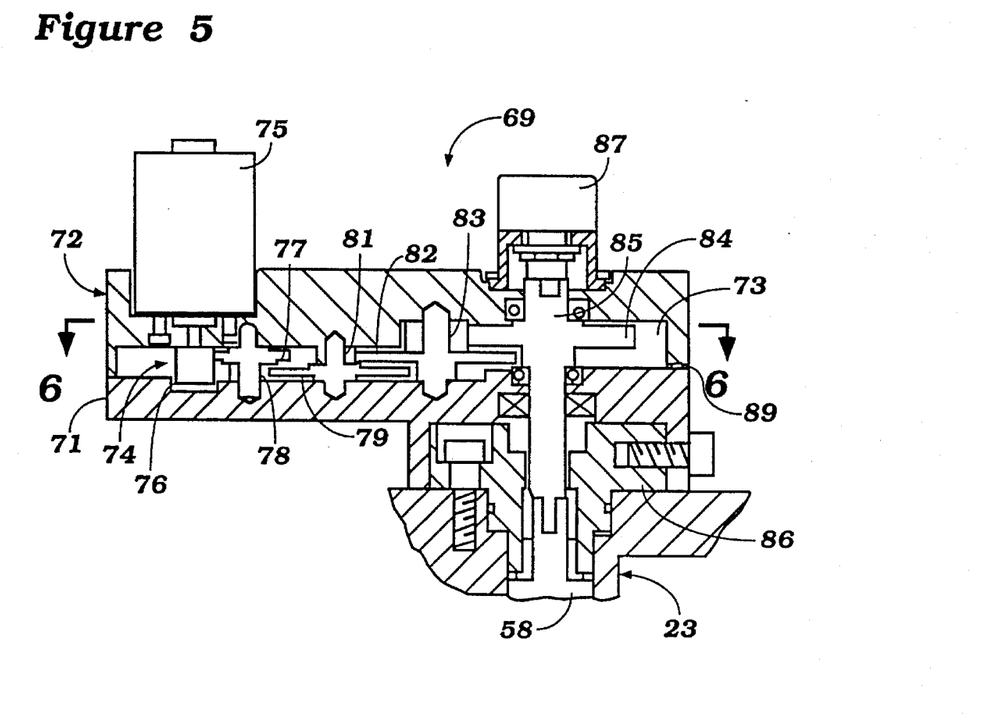
FIG. 5 is a still further enlarged cross-sectional view of the portion of the engine showing the exhaust control valve operating mechanism.
Figure 6:
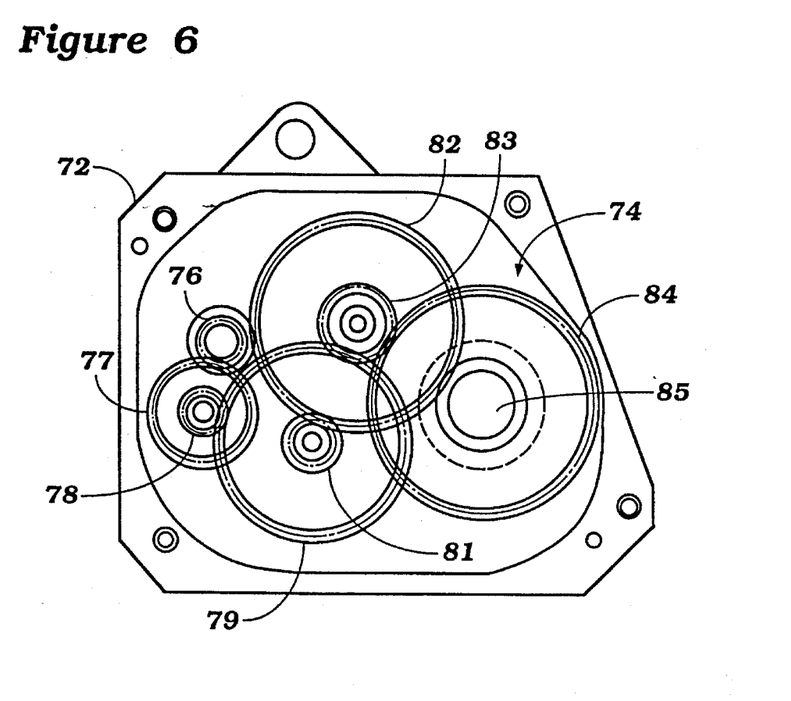
FIG. 6 is a cross-sectional view taken along the line 6—6 of FIG. 5.
Figure 7:
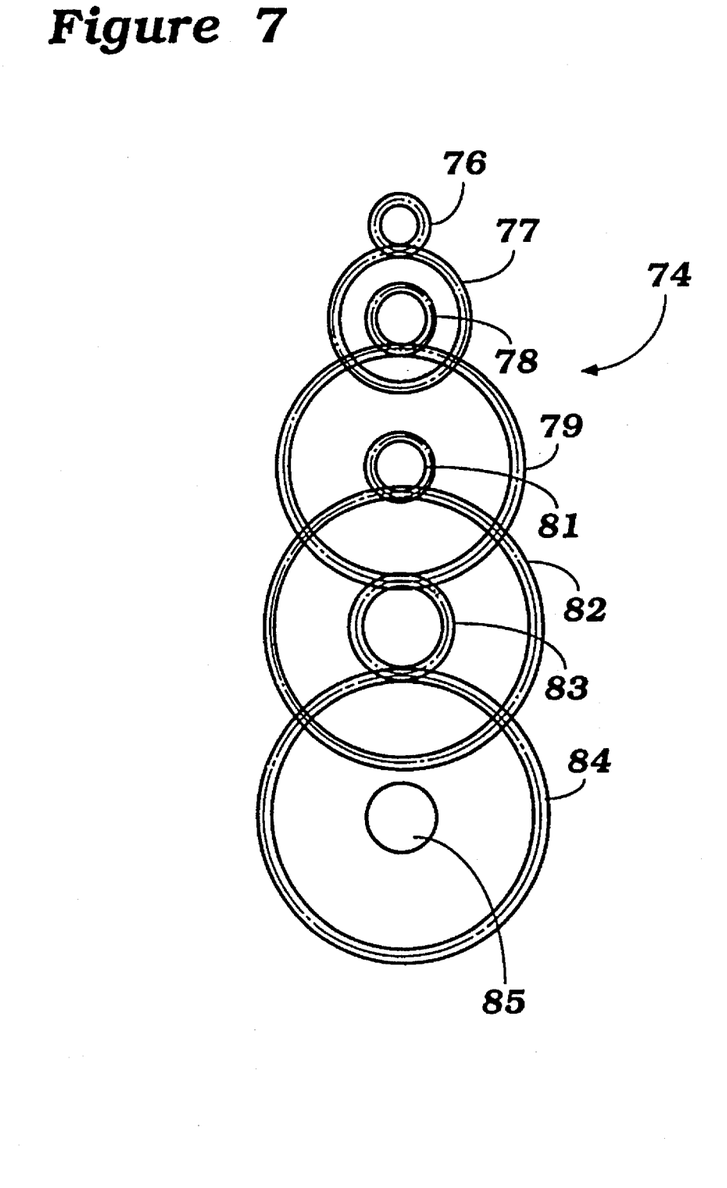
FIG. 7 is a developed view of the gear train shown in FIGS. 5 and 6 and shows how the speed reduction is obtained.
Figure 8:
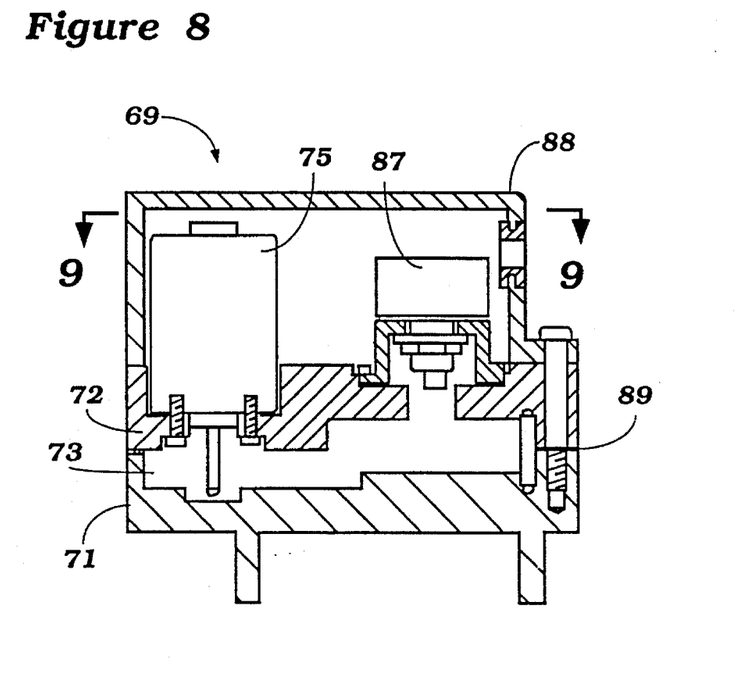
FIG. 8 is a cross-sectional view of the exhaust control valve operator and is taken generally along the line 8—8 of FIG. 9.
Figure 9:
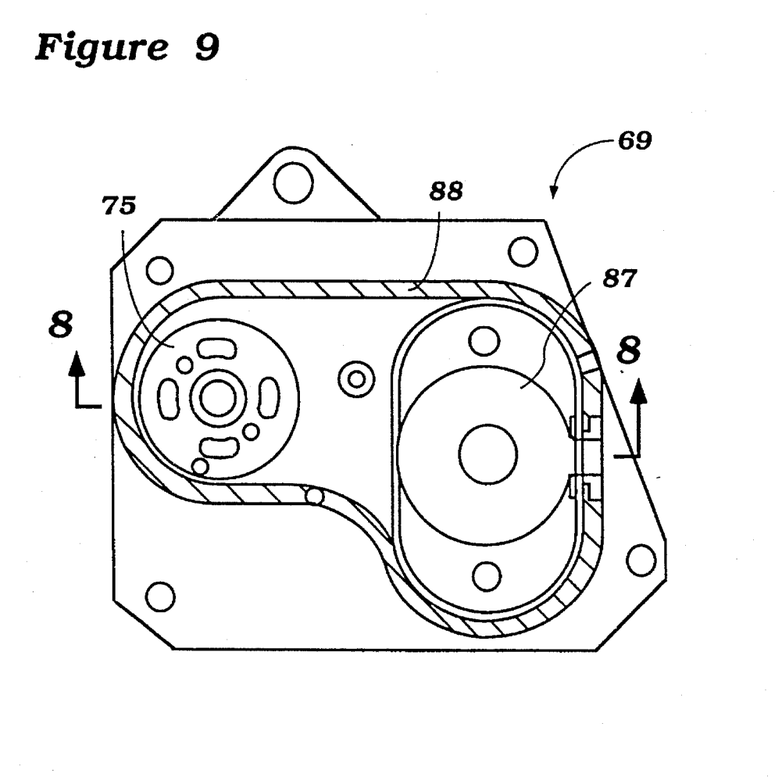
FIG. 9 is a cross-sectional view taken along the line 9—9 of FIG. 8.

As may be seen in FIG. 4, the exhaust control valve 57 includes a plurality of valving segments 58 which are slightably supported in a common bore 59 that extends transversely through the cylinder block at one side thereof. The valve segments 58 have tongue and groove connections, indicated generally by the reference numeral 61 with each other so as to permit relative thermal expansion, which causes a difference in the distance between the centers of the cylinder bores 23, while maintaining control of their angular relationship so that they will all be synchronized with each other. Any desired strategy may be employed for operating the control valve 57. The mechanism for operating the control valve 57 will be described later.

The engine 21 is also provided with an arrangement for controlling the amount of scavenging flow and this includes an air manifold 62 that communicates with the crankcase chambers 31 and in which control valves 62 are provided. By opening the control valves 62, the crankcase chambers of the cylinder bores 23 may be communicated with each other so as to decrease the amount of scavenging air flow. Again, these valves 62 may be controlled in any appropriate manner.

An accessory drive pulley 64 is mounted on the exposed forward end of the crankshaft 27 and drives a driven pulley 65 through a flexible belt 66. The pulley 65 may be coupled to an engine accessory such as a generator, high pressure fuel pump, or any other well known accessory. In addition, a plurality of pulleys 65 may be driven by the belt 66 from the drive pulley 64 for driving a number of accessories.

A flywheel 67 is affixed to the opposite end of the crankshaft 27 and is contained within a flywheel cover 68. The flywheel 67 has a starter gear 69 that cooperates with an electrical starter for starting of the engine 21 in a well known manner. In addition, a clutch mechanism (not shown) may be coupled to the flywheel 67 for driving either a vehicle or whatever load may be driven by the engine 21.

Reverting now to the drive for the control valve 57, this mechanism is shown best in FIGS. 3–7 and is identified generally by the reference numeral 69. As may be best seen in FIG. 3, this drive mechanism 69 may be conveniently positioned at the flywheel end of the engine and in a space adjacent the flywheel cover 68 because of its compact nature. As a result, it is possible to mount the exhaust control valve drive for the exhaust control valve 57 directly on the cylinder block 22 and in direct driving relationship to the exhaust control valve 57 so as to maintain not only a compact assembly but also so as to insure that there will be no transmission problems in transmitting the drive from a remote location.

The drive mechanism 69 includes a gear case comprised of a pair of housing members 71 and 72 that are fixed to each other and which define a transmission cavity 73 in which a step down transmission, to be described, is contained. This transmission is indicated generally by the reference numeral 74 and its construction may be best understood by reference to FIGS. 5–9, with FIG. 7 being a developed view showing how the transmission gears actually cooperate with each other.

The drive 69 includes an electric motor 75 that is carried by the housing piece 72 and which has a pinion gear 76 affixed to its output shaft within the cavity 73 and which forms the input of the transmission 74. The gear 76 meshes with a larger diameter gear 77 which is formed integrally with a smaller diameter gear 78 so as to provide a first step down in transmission speed. The gear 78, in turn, meshes with a larger gear 79 so as to provide a further speed reduction. A gear 81 is formed integrally with the gear 79 and meshes with a larger gear 82 to provide a third reduction stage. This larger gear 82 has formed integrally with that a smaller gear 83 which, in turn, meshes with a larger gear 84 to provide the fourth speed reduction stage. The gear 84 is formed integrally with a shaft 85 which is journaled in the housing pieces 71 and 72 and which extends through a support bushing 86 to provide a driving relationship with the tongue and groove connection of the first segment 58 of the control valve 57 as clearly shown in FIGS. 4 and 5. As a result of this step down transmission, the control valve 57 can be accurately positioned and driven with a relatively high force from a relatively small electric motor so as to insure good operation and the accurate position of the control valve 57.

An encoder 87 such as a potentiometer is mounted on the housing piece 72 and has a tongue and groove connection with the shaft 85 so as to output a signal indicative of the position of the control valve 57 for control purposes.

A cover piece 88 (FIG. 3) may be mounted over the drive assembly 69 for its protection. In order to provide further protection, an insulating plate 89 may be interposed between the housing pieces 71 and 72 and the bushing 86 may also be formed from a heat insulating material. This will insure that heat from the engine will not be transmitted to the exhaust control valve drive 69.

Figure 10:
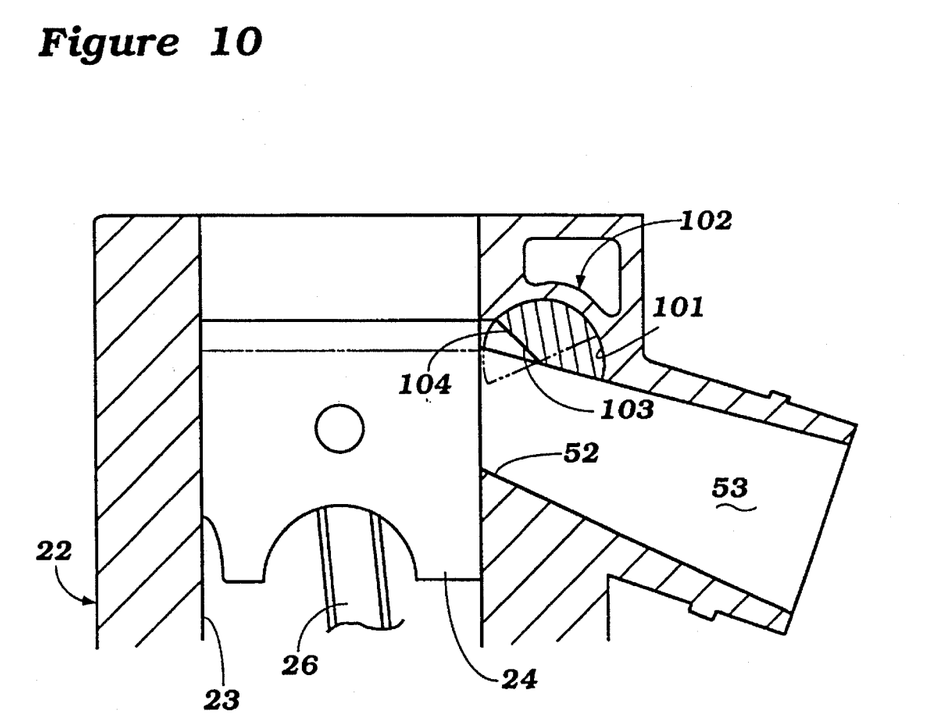
FIG. 10 is a cross-sectional view, in part similar to FIG. 1 and shows another type of exhaust control valve with which the invention may be utilized.

In the embodiment as thus far described, the exhaust control valve 57 has been disposed in a separate auxiliary exhaust passage 56 having separate auxiliary exhaust ports 55. However, the invention may also be employed in conjunction with an arrangement of the type wherein the exhaust control valve is positioned at the upper peripheral edge of the main exhaust port 52 and changes its timing and such an arrangement is shown in FIG. 10. Since the only difference between this embodiment and the previous one is the exhaust control valve and its location, other portions of the engine have not been illustrated and where components are not illustrated, it should be assumed that they are the same as those previously described.

In this embodiment, a bore 101 extends transversely across the upper end of the exhaust passage 53 and rotatably journals an exhaust control valve 102 having individual segments 103 each of which has a valving section 104. As may be seen in FIG. 10, when the exhaust control valve 102 is in the solid line position, the time at which the exhaust port will close is retarded and the time when the exhaust port will open is advanced so as to decrease the effective compression ratio. By rotating the exhaust control valve 102 from the position shown in solid lines to the position shown in phantom lines, the effective closing time can be advanced and the opening time retarded so as to decrease the compression ratio.

It should be readily apparent from the foregoing description that the described embodiments of the invention are extremely effective in providing good exhaust timing and compression ratio control and also a compact engine assembly since the operating mechanism for the exhaust control valve can be mounted directly on the engine in an area adjacent the flywheel covers which would otherwise be vacant and unobstructed. Of course, the foregoing description is that of preferred embodiments of the invention and various changes and modifications may be made without departing from the spirit and scope of the invention, as defined by the appended claims.

We claim:

1. An internal combustion engine comprised of a cylinder block having a plurality of cylinder bores, a cylinder head affixed to said cylinder block and defining a plurality of variable volume combustion chambers with said cylinder bores, a plurality of exhaust ports communicating said combustion chambers with the atmosphere, an exhaust control valve rotatably supported by one of said cylinder head and said cylinder block about an axis extending transversely to said cylinder bores for controlling the effective timing of the opening and closing of said exhaust ports, a crankshaft journaled in said cylinder block for rotation at the end thereof opposite said cylinder head, a flywheel affixed to one end of said crankshaft, an accessory drive at the other end of said crankshaft for driving at least one engine accessory thereof, and a servomotor mounted at the end of said one of said cylinder head and said cylinder block adjacent said flywheel for driving said exhaust control valve through a gear train, the mounting of said servomotor spacing said servomotor from said cylinder head and said cylinder block for providing a cooling air gap therebetween.

2. The internal combustion engine of claim 1, further including an encoder affixed for rotation with the exhaust control valve and carried by the gear reduction assembly.

3. The internal combustion engine of claim 1, wherein the gear train comprises multi-stage gear reduction contained within a protective housing.

4. The internal combustion engine of claim 3, wherein the servomotor is supported on the protective housing.

5. The internal combustion engine of claim 4, wherein the servomotor is also enclosed within a protective housing.

* * * * *